INVENTOR:
JOHN J. FRANKLIN
BY Howson & Howson
ATTYS.

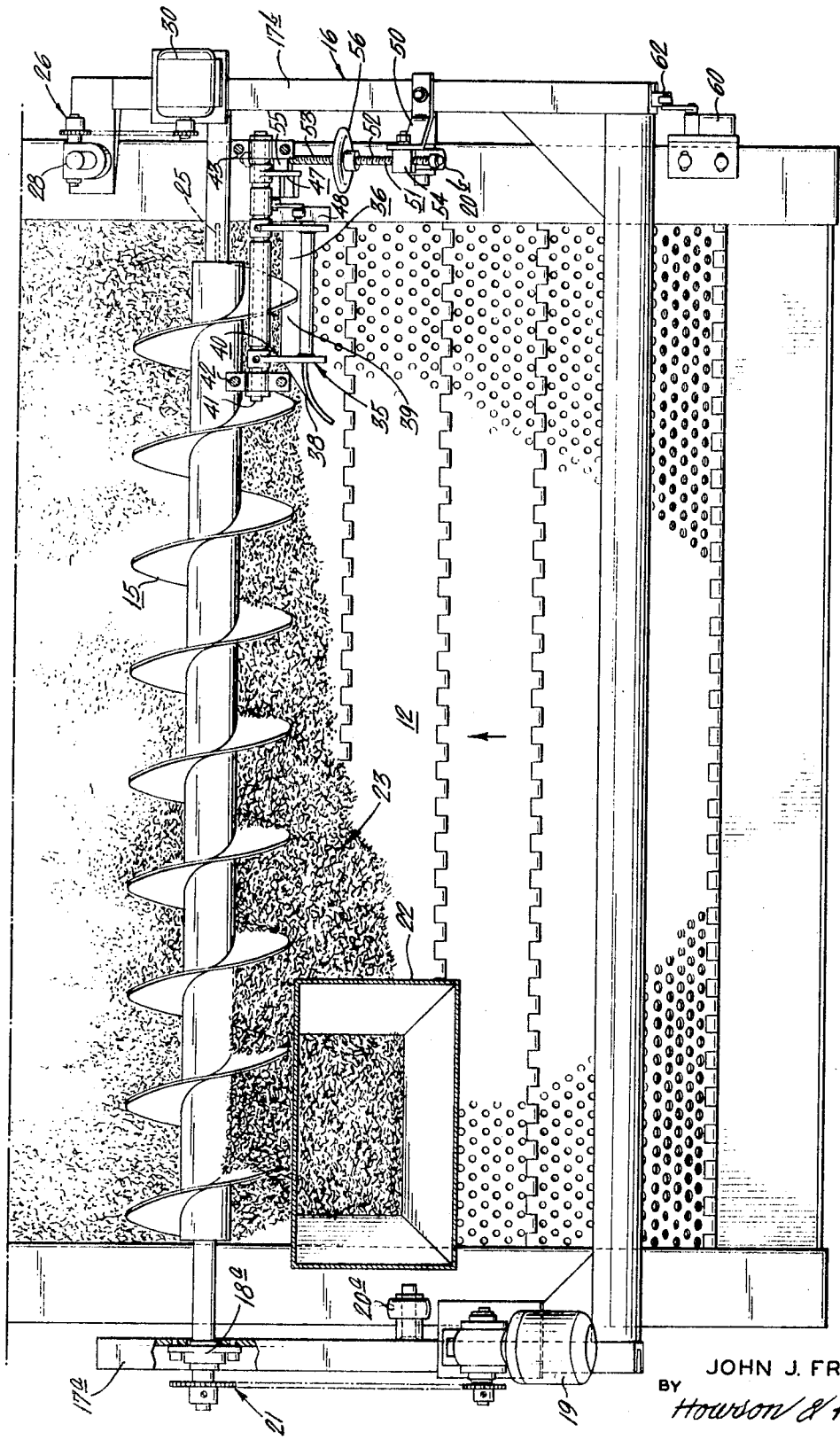

United States Patent Office 3,513,961
Patented May 26, 1970

3,513,961
SPREADER FOR PARTICULATE MATERIAL
John J. Franklin, Glenside, Pa., assignor to Proctor & Schwartz, Inc., Philadelphia, Pa., a corporation of Pennsylvania
Filed Aug. 13, 1968, Ser. No. 752,236
Int. Cl. B65g 47/19
U.S. Cl. 198—53                    10 Claims

ABSTRACT OF THE DISCLOSURE

A moving conveyor surface for particulate material having a loading station on one side thereof is provided with automatic apparatus for distributing the particulate material in a uniform layer across the conveyor. The apparatus comprises a rotary auger mounted on a frame transverse to the moving conveyor and adapted to be raised and lowered to control the displacement of the material across the conveyor. Feeler means senses the accumulation of particulate material at the opposite side of the conveyor and automatically adjusts the frame upwardly and downwardly to thereby vary the distribution of the particulate material while maintaining a uniform layer across the conveyor surface.

---

The present invention relates to spreaders for particulate material, and more particularly, the present invention relates to a spreader for distributing particulate material in a uniform layer across a moving conveyor.

The drying of large volumes of particulate material is conventionally performed by depositing the material on a conveyor and moving the conveyor through an oven to heat the material and to drive off excess moisture. In many applications, the moisture content of the dry particulate material is critical, since excess dryness may cause deterioration of the product through overheating, and insufficient dryness may lead to difficulty in subsequent handling or may permit the growth of micro-oragnisms such as mold or mildew.

In conventional dryers the material on the conveyor is dried by hot air passing upwardly or downwardly through perforations in the surface of the conveyor as it advances through the oven. As long as the material is evenly distributed across the width of the conveyor, proper drying is effected since the hot air must pass through all the particulate material. Since the overall feed rate of material to the conveyor is maintained relatively constant, the distribution of material lengthwise on the conveyor does not vary enough to affect the drying of the particulate material. To the extent that the material is unevenly distributed across the conveyor, for example when the distribution of material is thinner on one side than on the other, the material is improperly dried since a greater portion of air flows through the more thinly distributed material. This causes the thinly distributed material to be excessively dried, and the more thickly distributed material to be inadequately dried, both conditions being undersirable. Therefore, uniform distribution of the material across the entire width of the conveyor is of utmost importance to effect proper drying.

Heretofore, apparatus has been provided to distribute particulate material across the surface of a conveyor preparatory to drying; however, certain disadvantages have been inherent in the prior art spreaders. Some of these spreaders require the presence of an operator to continuously make manual adjustments in order to produce an even layer of material on the conveyor, and their effectiveness is dependent upon the skill of the operator. Other known spreaders in which some form of automatic adjustment is provided require considerable space for installation and are expensive to manufacture and to maintain.

With the foregoing in mind, it is a primary object of the present invention to provide an improved apparatus for automatically distributing particulate material across a moving conveyor to produce a uniform layer of the material thereon.

Another object of the present invention is to provide a novel automatic spreader for particulate material which is compact and relatively inexpensive to manufacture and maintain.

As a further object, the present invention provides a unique spreader for particulate material which obviates the need for an operator to continuously adjust the spreader to effect a uniform layer of particulate material across a conveyor.

A still further object of the present invention is to provide an apparatus for distributing particulate material on the surface of a conveyor in a uniform layer across the conveyor irrespective of variations in the feed rate of material onto the conveyor.

More particularly, the present invention provides apparatus for automatically distributing particulate material in a uniform layer across the surface of a moving conveyor. The apparatus comprises a rotatable auger disposed across the width of the moving conveyor parallel to the surface of the conveyor and mounted on a frame which pivots on a horizontal axis. Drive means is connected to the frame to raise and lower the auger into operative engagement with the particulate material on the conveyor, and feeler means is suspended adjacent the far end of the auger to sense the accumulation of material thereat and thus respond to the feed rate of particulate material onto the conveyor, the feeler means being displaced outwardly from the auger when the feed rate is above a predetermined quantity and being displaced inwardly toward the auger when the feed rate is below a predetermined quantity. In addition, means is provided to actuate the drive means to raise the auger in response to the outward displacement of the feeler means and to lower the auger in response to the inward displacement of the feeler means. The auger is thereby adjusted vertically as it rotates to vary the depth of engagement thereof with the particulate material and to thereby distribute the particulate material in a uniform layer on the surface of the conveyor.

In addition to the foregoing objects, other objects, features and advantages of the present invention will become apparent from the following description taken in conjunction with the accompanying drawings in which:

FIG. 6 is a sectional view taken along line 6—6 of FIG. 2 and illustrating the frame and mounting arrangement for supporting the auger;

Figure 2:
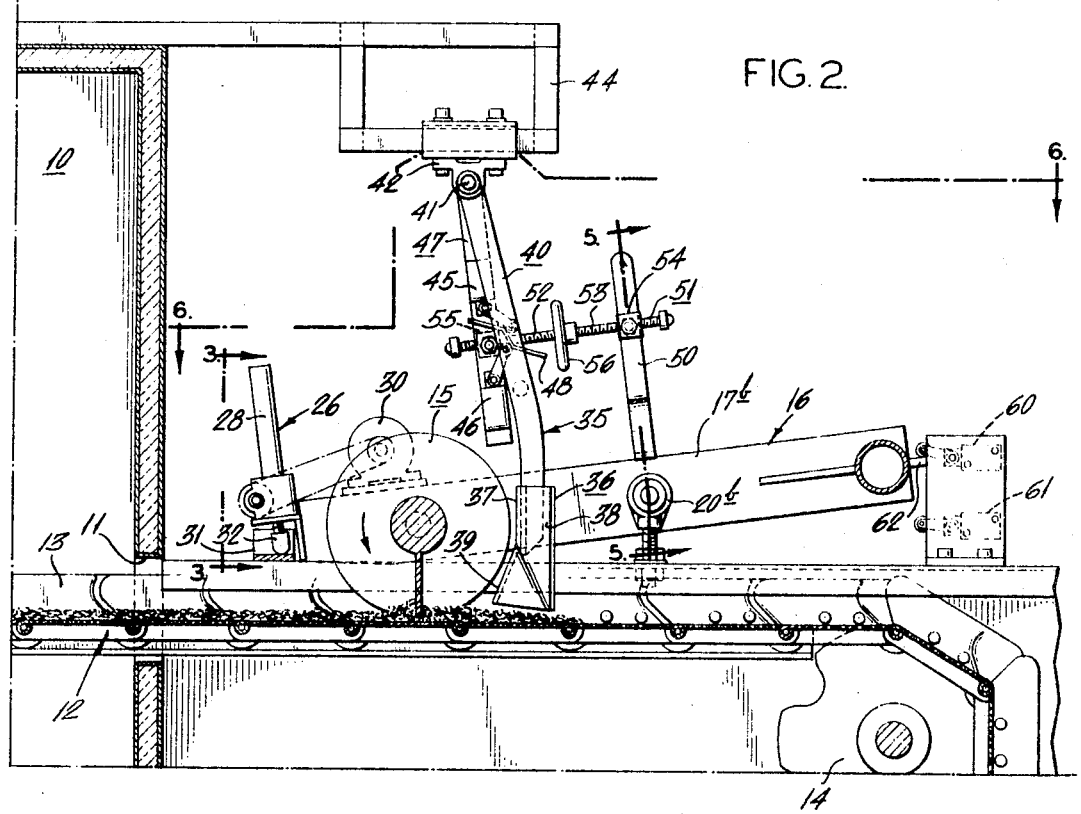
FIG. 2 is a sectional view taken along line 2—2 of FIG. 1 to illustrate the cooperation between the auger and the feeler means of the present invention.

Referring now to the drawings, and more particularly to FIG. 2, it may be seen that a conventional oven or dryer 10 is provided with an elongated portal 11 which receives a conveyor apron or surface shown generally at 12. The conveyor surface 12 is of conventional heavy-duty construction, and is perforated to facilitate the passage of hot air upwardly or downwardly through the bed of material thereon. The conveyor surface 12 is also provided with uptsanding sides 13 which cooperate to contain particulate material on the conveyor, and the surface 12 is advanced through the oven 10 by a suitable drive unit which, in the present instance, includes a sprocket 14.

Figure 3:
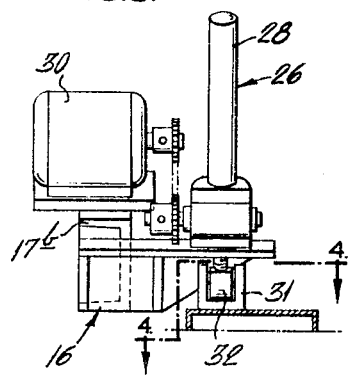
FIG. 3 is an enlarged view taken along line 3—3 of FIG. 2 to illustrate the drive means for raising and lowering the frame which mounts the auger.
Figure 5:
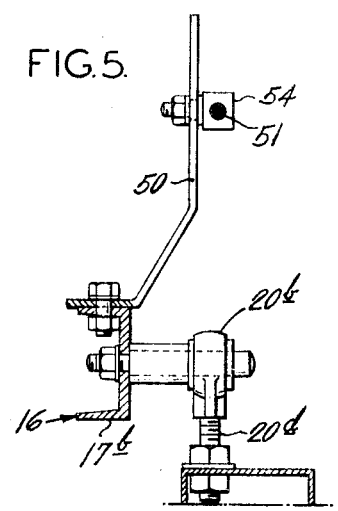
FIG. 5 is an enlarged sectional view taken along line 5—5 of FIG. 2 and illustrating an arm of the linkage means employed in the present invention.
Figure 4:
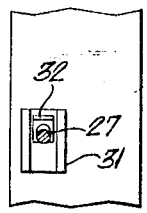
FIG. 4 is an enlarged fragmentary view taken along line 4—4 of FIG. 3 to illustrate a saddle which cooperates with a jackscrew on the drive means to raise and lower the frame.

As noted heretofore, proper drying of particulate materia lis effected when the material is distributed in a uniform layer across the surface of a conveyor prior to entering an oven or drying chamber. Therefore, in accordance with the primary object of the present invention, apparatus is provided for automatically distributing particulate material in a uniform layer across the surface of a conveyor. To this end, the spreader apparatus comprises an auger or screw 15 (FIGS. 1, 2, 3) which overlies the conveyor transversely to the path of movement thereof and, in the present instance, the auger is mounted at right angles to the direction of movement of the conveyor. As may be seen in FIG. 1, the lower periphery of the auger 15 is supported substantially horizontal or parallel with the surface of the conveyor, and the auger extends across substantially the entire width of the conveyor. The auger 15 is supported for rotation by a frame 16 which has a pair of beams 17a and 17b which extend along the conveyor, and a ball or roller bearing assembly, shown for example at 18a, rotatably supports each end of the auger 15 on the beams. The frame 16 is pivotally mounted on pillow blocks 20a, 20b which may be individually adjusted, for example by means of an adjusting screw 20d (see FIG. 5) to level the auger with respect to the conveyor. A gear reduction motor 19 is connected to a suitable source of electrical energy and is mounted on one of the beams, in the present instance the left-hand beam 17a, the motor 19 rotating the auger 15 in the direction indicated in FIG. 2 through a conventional sprocket and chain drive shown generally at 21.

Particulate material is deposited on the conveyor bed by a hopper or chute 22 (FIGS. 1, 6) positioned behind the auger screw 15 adjacent one side of the conveyor, in the present instance on the left-hand side. Particulate material, indicated at 23, is fed by gravity onto the conveyor bed, and the movement of the conveyor in the direction of the arrow indicated in FIG. 6 transports the particulate material 23 from the hopper or loading station 22 to the auger 15. The particulate material 23 is thereby brought into engagement with the left-hand end of the auger 15, and rotation of the auger in the indicated direction displaces the particulate material rightward across the conveyor bed. If desired, a vibratory mechanism or gate may be provided in the hopper or chute 22 to control the feed rate of material onto the conveyor.

Figure 1:
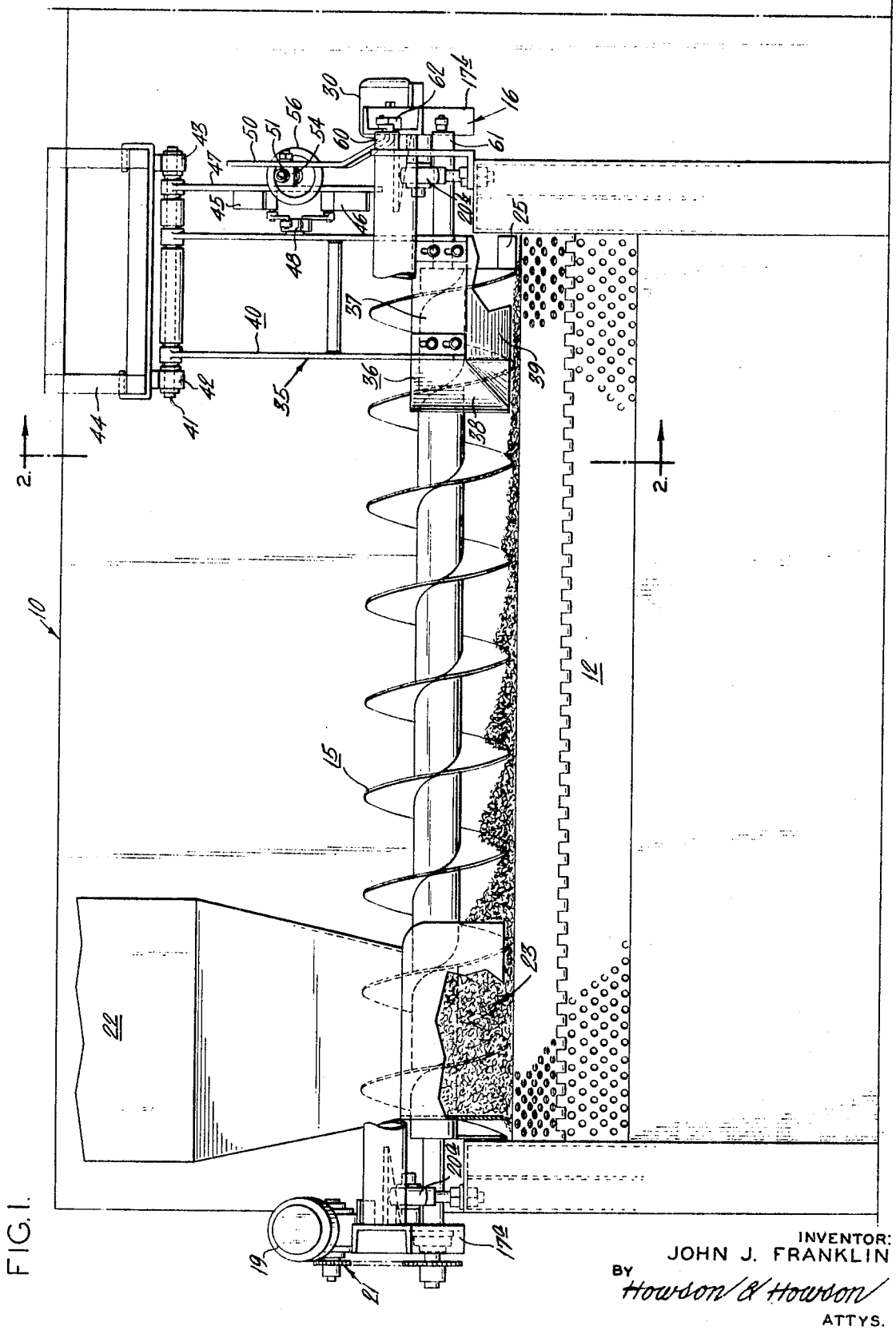
FIG. 1 is a front elevational view of a spreader apparatus embodying the present invention.

As may be seen in FIG. 1, the level of the particulate material on the side of the auger facing the loading station gradually decreases as the material is displaced across the conveyor; however, when the quantity of particulate material deposited on the conveyor is excessive, for example when the feed rate is high, the general level of the material tends to be higher and there is also a tendency for the material to buildup or accumulate beyond the right-hand side of the auger. In order to avoid an excessive accumulation of material at this location, a tab 25 is provided on the auger 15. The tab 25 extends inwardly from the periphery of the auger and axially therealong so that upon rotation of the auger, the tab 25 periodically engages the material which has accumulated to thereby level the material beyond the right-hand end of the auger.

In accordance with the primary object of the present invention, the auger is raised and lowered into operative relationship with the particulate material on the conveyor surface to produce a uniform layer of material across the entire width of the conveyor. To this end, drive means, shown generally at 26 (FIGS. 2 and 7), is provided. The drive means 26 is mounted on one end of the right-hand beam 17b and comprises a jackscrew 27 mounted in a housing 28, the jackscrew being displaced axially upon rotation of a nut 29 connected to a reversible electric motor 30 through a worm gear arrangement 34. In order to support and guide the lower end of the jackscrew 27 when the frame pivots on its axis, a saddle or bracket 31 is provided to engage a bearing element 32 provided on the lowermost end of the jackscrew, the bearing element 32 sliding within the saddle 31 as the frame pivots. Therefore, when the motor 30 is rotated in reverse directions, the jackscrew is displaced in alternate directions inwardly and outwardly of the housing to pivot the frame on its axis for raising and lowering the auger.

In the present invention the conveyor continuously advances a volume of material from the loading station to and beyond the auger. At a constant feed rate and for a predetermined conveyor width and linear velocity, the input or volume of undistributed material conveyed to the auger must be substantially equal to the output or volume of distributed material conveyed away from the auger. In order to maintain equilibrium between the input to the auger and the output therefrom, a change in the input must be balanced by a corresponding change in the output. In the present invention, the equilibrium is maintained by raising the auger when the input increases and lowering the auger when the input decreases to thereby adjust the thickness of the layer on the conveyor. In this manner, the particulate material is distributed in a uniform layer across the conveyor to equalize the input and output of the auger.

It has been found that changes in the input to the auger are reflected in the quantity of material which accumulates at one end of and behind the auger on the side thereof facing the loading station. Therefore, when the input increases, an overaccumulation of material occurs at the right-hand or far end of the auger; and, when the input decreases, an underaccumulation occurs at the far end of the auger as may be seen in FIG. 1. In accordance with the present invention, means is provided to sense the accumulation of material at the far end of the auger, and to this end, feeler means, shown generally at 35, is provided adjacent the periphery of the auger at the right-hand side of the conveyor.

The feeler means 35 comprises a paddle 36 (FIGS. 2 and 6) suspended behind the auger. The paddle 36 has a substantially vertically flat or planar portion 37 extending from the far end a short distance along the periphery of the auger 15 and terminating in a curved portion 38 which curves outwardly from the periphery of the auger (FIG. 6). The flat portion 37 has a lower extension 39 which angles inwardly and downwardly toward the conveyor surface to partially underlie the auger as may be seen in FIGS. 2, 7, and 8, and the curved portion 38 cooperates with the auger to funnel the material between the paddle and the auger and thereby cam the paddle 36 outwardly from the auger when an overaccumulation of material occurs at the far end thereof. Conversely, the paddle 36 is displaced inwardly toward the auger 15 in response to the underaccumulation of particulate material, the displacement of the paddle 36 being representative of the capability of the auger to effect proper distribution of material across the entire width of the conveyor surface. In the present instance, the paddle 36 is carried by an upright member 40 which is secured at its upper end to a shaft 41, the shaft 41 being parallel to the pivot axis of the frame 16 and journalled in bearings 42, 43, which are fastened to a superstructure 44 mounted above the conveyor. In this manner, the paddle is permitted to swing inwardly and outwardly of the auger in response to the accumulation of particulate material behind the auger at the right-hand end thereof, the position of the paddle being representative of the input of material to the auger.

For the purpose of automatically energizing the drive means to raise and lower the auger, means is provided to actuate the drive means in response to the displacement of the feeler means. To this end, the actuating means comprises a pair of limit switches 45 and 46 (FIGS. 2, 7, 8) carried by a link 47 which is mounted on the shaft 41 to pivot independently of the member 40. In the present instance, the switch 45 is connected to the motor 30 of the drive means to cause the motor 30 to rotate in a direction which pivots the frame clockwise on its axis and raises the auger relative to the conveyor, and the limit switch 46 is connected to the motor 30 to cause the motor to rotate in an opposite direction to pivot the frame counterclockwise and lower the auger.

In order to selectively actuate the limit switches, a cam 48 is provided on the member 40, the cam 48 being shaped to engage the operator of the limit switch 45 when the member 40 is moved rearwardly relative to the link 47. In this manner, displacement of the paddle 36 outwardly from the auger in response to an overaccumulation of material at its right-hand end pivots the member 40, closes the switch 45, and actuates the drive motor 30 to raise the auger. Conversely, displacement of the paddle 36 inwardly toward the auger pivots the member 40 forwardly to engage the operator of the switch 46, and closes the switch to thereby actuate the motor 30 in a reverse direction to lower the auger. In this manner, selective engagement of the limit switches 45 and 46 by the cam 48 adjusts the auger upwardly and downwardly in response to the displacement of the paddle to thereby level the material across the entire width of the conveyor. In addition, it is preferable for the cam to be disposed between the limit switches to permit slight deflections of the paddle carrying member without actuating either switch operator. In this way, continuous adjustment of the auger is avoided and the performance of the apparatus is improved.

In accordance with another important object of the present invention, the vertical displacement of the auger is accurately controlled to maintain a uniform distribution of material across the entire surface of the conveyor. To this end, linkage means is provided which cooperates with the feeler means to provide a feedback to the actuator means to thereby accurately control the vertical displacement of the auger. The linkage means comprises an upstanding arm 50 (FIGS. 2, 6) bolted to the beam 17b, in the present instance normal to the pivot axis of the beam. The arm 50 terminates in an offset portion which cooperates with the switch-carrying link 47 by a threaded rod 51 oppositely threaded at each end as indicated at 52 and 53. A swivel nut 54 (FIG. 6) is secured to the arm 50 to rotatably receive one end of the threaded rod 51, and a swivel nut 55 is similarly mounted on the link 47 to rotatably receive the other end of the rod 51. In this manner, the rod couples the arm 50 to the link 47 so that they move in response to the movements of the frame.

In order to initially adjust the normal operating position of the auger, means is provided for rotating the threaded rod to change the relative positions of the arm and the link. To this end, a handwheel 56 is secured to the threaded rod at its midpoint, so that upon rotation of the handwheel in one direction the link is moved toward the arm, and upon rotation of the handwheel in the opposite direction, the link is moved away from the arm. In this manner, the position of the auger may be initially adjusted to correspond with the anticipated minimum feed rate of material to the conveyor, the auger being automatically raised above the minimum position when the feed rate increases above the minimum quantity.

The initial adjustment of the auger is effected by rotating the handwheel when the paddle is located adjacent the auger as occurs in the absence of particulate material at the paddle (see FIG. 2). By rotating the handwheel in a direction to move the link 47 toward the arm 50, the limit switch 45 is engaged by the cam 48 on the member 40 and the drive means is energized to raise the frame and the auger. When the frame and auger is raised to the position corresponding to the minimum anticipated feed rate, the cam 48 disengages the limit switch 45 and de-energizes the drive means to arrest further movement of the frame. This position of the auger is therefore the minimum operating position since particulate material must now accumulate to a higher level behind the auger to displace the paddle and actuate the drive means to automatically raise the auger.

Figure 7:
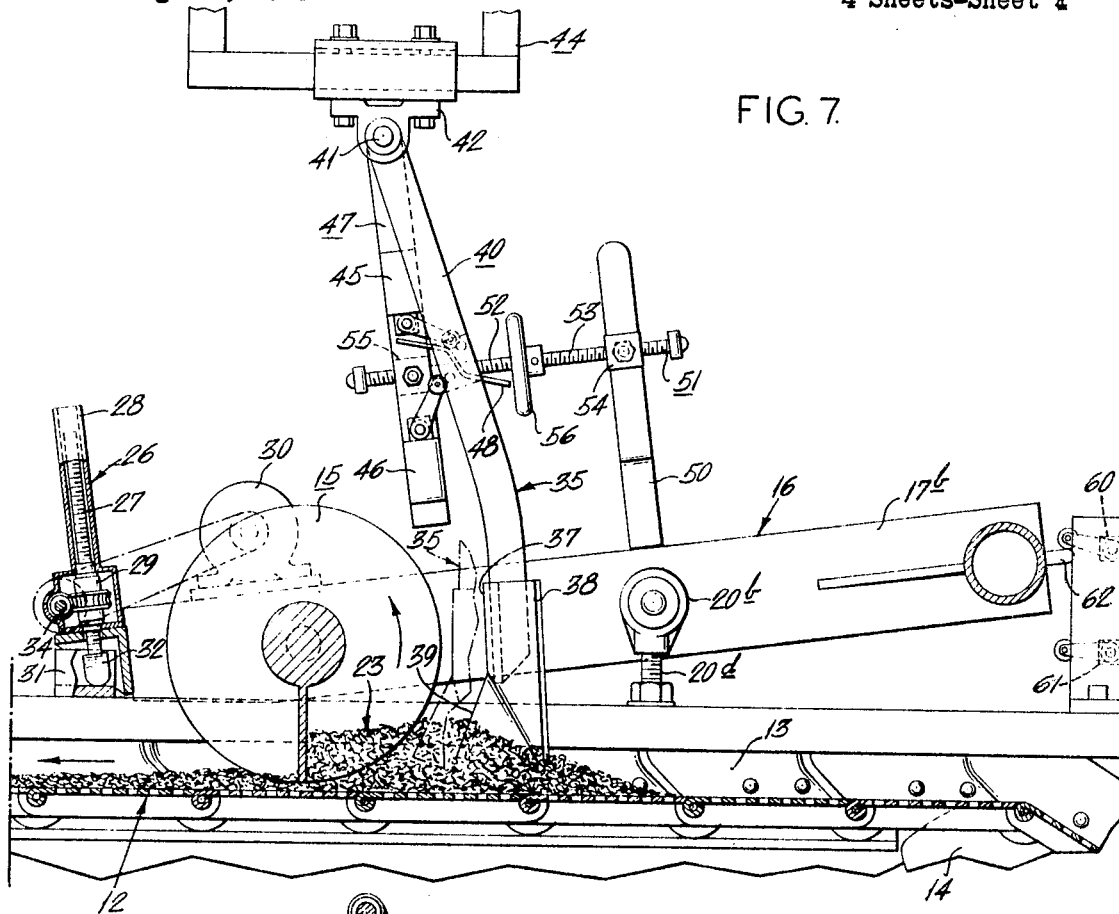
FIG. 7 is an enlarged fragmentary view of the apparatus of FIG. 2 illustrating the auger in its lowermost position and showing the feeler means in engagement with a limit switch for actuating the drive means to raise the auger.
Figure 8:
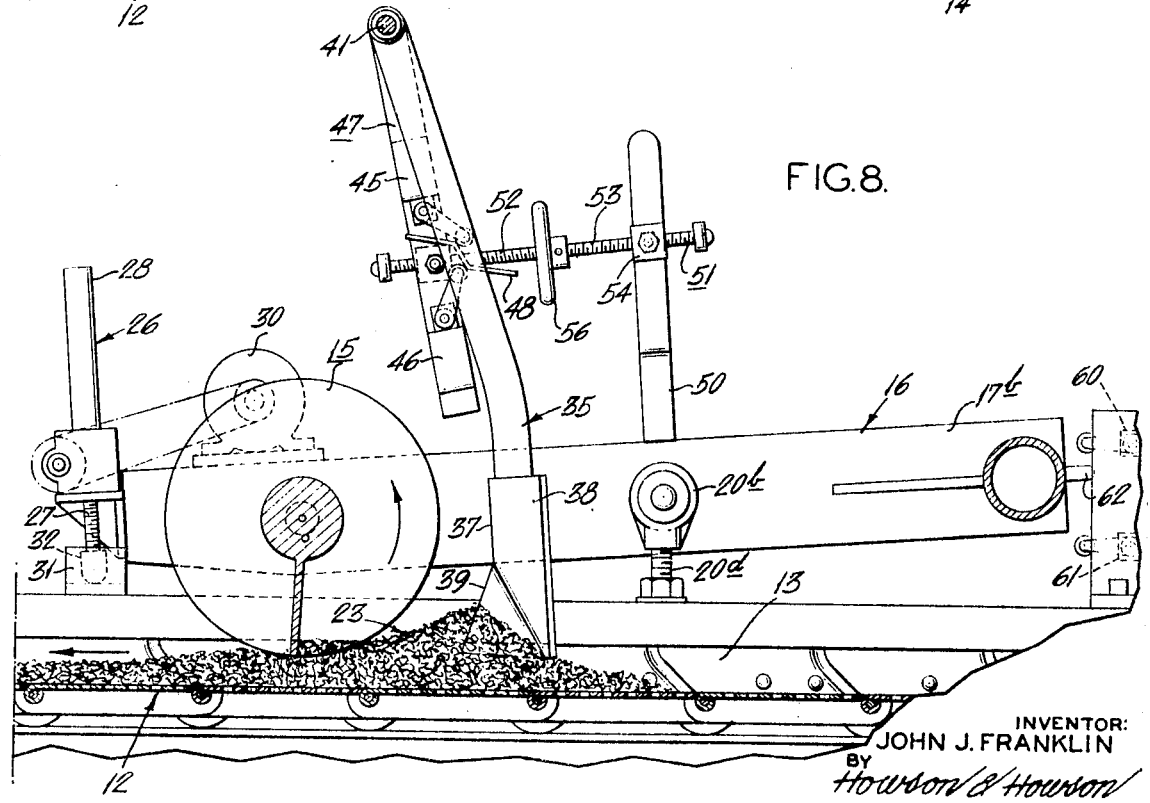
FIG. 8 is a fragmentary view similar to FIG. 7 illustrating the auger and the feeler means in normal operating positions.

For the purpose of limiting the vertical movement of the auger to obviate potential damage to the auger and the conveyor, limit switches 60 and 61 (FIG. 2) are provided to engage a spur 62 on the frame. The limit switches 60 and 61 are connected to the drive motor 30 to de-energize the motor when the switches are selectively engaged by the spur. Thus, when the auger reaches its lowermost position as seen in FIG. 7, the spur 62 engages the switch 60 and de-energizes the motor 30 to prevent further downward movement of the auger. Conversely, when the auger reaches its uppermost position, the spur 62 engages the limit switch 61 and the motor 30 is de-energized to prevent further upward movement of the auger. In this manner, the limit switches 60 and 61 cooperate to prevent excessive movement of the auger and to thereby obviate potential damage to the auger and the conveyor.

In operation, the handwheel 56 is rotated to adjust the minimum operating position of the auger in accordance with the anticipated minimum feed rate to the conveyor. The drive unit for the conveyor 12 is then started, and the auger drive motor 19 is energized to rotate the auger 15. Particulate material is fed onto the conveyor 12 from the hopper 22 and is transported to the left-hand end of the auger. The rotating auger 15 engages the particulate material and displaces it rightward across the conveyor.

At start-up, the auger is normally in its lowermost or operating position, and the paddle is disposed as shown in broken lines in FIG. 7. As the particulate material is displaced across the conveyor, the material accumulates at the right-hand end of the auger and displaces the paddle rearwardly therefrom to the position shown in full lines in FIG. 7. In this position, the cam 48 engages the limit switch 45, the switch 45 is closed, and the motor 30 on the drive means is energized to pivot the frame 16 clockwise on its axis to thereby raise the auger 15. As the frame 16 pivots, the arm 50 rotates and moves the link 47 relative to the member 40. When the auger has moved to its new operating position, the cam 48 opens the limit switch 45 as may be seen in FIG. 8 and de-energizes the motor 30 to arrest further upward movement of the frame. The auger 15 remains in this opening position to distribute the particulate material across the entire width of the conveyor at a uniform level.

As the particulate material is leveled by the action of the auger and is carried forwardly by the conveyor, the accumulation at the right-hand end thereof decreases causing the paddle to swing forwardly toward the auger. A predetermined movement of the paddle and the member 40, as determined by the contour of the cam 48, causes the cam mounted thereon to engage the limit switch 46. The limit switch 46 is thereby closed to energize the motor 30 in a reverse direction to lower the auger. At the same time, the frame pivots on its axis and the arm 50 and the link 47 move relative to the member 40. When the new operating position of the auger is reached, the cam 48 on the member 40 opens the limit switch 46 and deenergizes the drive motor 30 to arrest further downward movement of the frame.

In the event of a malfunction of either of the limit switches which fails to halt the normal upward movement of the frame, the frame continues to pivot and the spur 62 on the frame engages the limit switch 61 to deenergize the drive means and prevent further movement of the frame. Should either of the limit switches malfunction and fail to halt the normal downward movement of the frame, the frame continues to move downwardly and the spur 62 engages the limit switch 60 to deenergize the drive means and prevent further movement of the frame.

Thus, in light of the foregoing, it may be seen that an automatic apparatus has now been provided for uniformly distributing particulate material across the entire width of a moving conveyor. Moreover, the apparatus of the present invention is not only compact and economical to manufacture, but it also provides a spreader which is accurate in operation and which is easy to maintain.

While a preferred embodiment of the present invention has been described in detail, various modifications, alterations or changes may be made without departing from the spirit and scope of the present invention as defined in the appended claims.

The embodiments of the invention in which an exclusive property or privilege is claimed are defined as follows:

1. In a conveyor for transporting particulate material and having a loading station, a movable surface adapted to receive the particulate material at the loading station, and means for moving the surface away from the loading station to advance the material, the improvement comprising an auger disposed transversely to the normal path of movement of the surface and rotatable on an axis to distribute the particulate material across the width of the surface, a frame supporting the auger for vertical displacement with respect to the surface, means for driving the frame vertically to raise and lower the auger into operative relationship with the material on the conveyor, feeler means mounted remote from said loading station to sense the accumulation of particulate material on the surface, said feeler means being displaceable in response to the accumulation of the particulate material on the surface, and means responsive to the displacement of said feeler means to actuate said frame driving means to raise said frame and auger in response to a predetermined overaccumulation of particulate material and to lower said frame and auger in response to a predetermined underaccumulation of particulate material, whereby the vertical position of the auger is automatically adjusted as it rotates to distribute the output therefrom across the width of the movable surface in a layer having a thickness which is adjusted to correspond with the undistributed input to the auger, so that the auger input and output is balanced to maintain a continuity of advance of material therepast.

2. Apparatus in accordance with claim 1 wherein the auger is spaced from the loading station in the direction of movement of the conveyor so that the particulate material deposited on the conveyor at the loading station is conveyed to the auger by the movable surface, and the feeler means has a paddle disposed adjacent to the periphery of and behind said auger on the same side as the loading station, said paddle being mounted for displacement along the direction of movement of the conveyor in response to variations in the accumulation of particulate material thereon, said paddle being displaced away from the auger in response to a predetermined overaccumulation of particulate material on the movable surface and being displaced toward the auger in response to a predetermined underaccumulation of particulate material on the movable surface, whereby the paddle is displaced an amount corresponding to the input of particulate material to the auger.

3. Apparatus in accordance with claim 2 wherein said loading station is located at one side of said movable surface and said paddle is mounted adjacent the other side thereof, said paddle extending along the periphery of said auger and having a planar portion and an arcuate portion, said planar portion having an extension angled downwardly toward the conveyor surface and inwardly toward the auger to partially underlie the auger, and said arcuate portion curving outwardly from the periphery of the auger, so that the particulate material displaced across the conveyor by the auger is funneled between the auger and the planar portion of the paddle to effect a positive displacement of the paddle.

4. Apparatus in accordance with claim 1 wherein said frame has a beam extending along the conveyor and rotatably supporting one end of the auger, said beam being mounted adjacent the conveyor for pivotal movement on a horizontal axis tranverse to the path of movement of the conveyor surface, and said means to actuate said frame displacing means comprises a first member carrying said feeler means and mounted to pivot on an axis parallel with the pivot axis of said beam, a second member pivotally mounted for movement independently of said first member and in a plane normal to the pivot axis of said beam, linkage means connecting said second member to said beam to displace said second member relative to said first member upon pivoting of said beam, and means responsive to the relative movement between said first and second members to actuate said driving means to selectively raise and lower said frame and auger into operative relationship with the material on the movable surface, whereby the position of the auger is automatically adjusted to effect a uniform distribution of material across the width of the movable conveyor surface.

5. Apparatus according to claim 4 wherein said frame driving means is electrically powered and said means to actuate said frame driving means comprises a first limit switch and a second limit switch both carried by one of said members, a cam provided on said other member to selectively engage said first and second limit switches for actuating said frame driving means in response to a predetermined relative displacement between said members, whereby said first and second limit switches cooperate with said members to accurately control the operating position of the auger.

6. Apparatus in accordance with claim 5 wherein said linkage means comprises an arm projecting outwardly from said beam for displacement in response to the angular displacement of said beam, a threaded adjusting rod connecting said arm and said second member, said rod being oppositely threaded adjacent its ends, a swivel nut provided on said arm for rotatably connecting one end of said rod thereto, a swivel nut provided on said second member for rotatably connecting the other end of said rod thereto, and means for rotating the rod, whereby upon rotation of the threaded rod the second member is moved relative to the arm and the first member and the cam selectively engages one of the limit switches to pre-adjust the normal operating position of the auger.

7. Apparatus according to claim 1 wherein said feeler means is located adjacent one side of the conveyor and said auger extends across substantially the entire width of the conveyor surface and terminates adjacent said feeler means, said auger having a tab extending inwardly from the periphery of the auger and axially therealong for periodically engaging particulate material adjacent said one side of the conveyor, whereby upon rotation of the auger the tab periodically engages particulate material on the conveyor surface to obviate an excessive accumulation of material adjacent the feeler means.

8. Apparatus for evenly distributing particulate material across a moving surface comprising: an auger disposed across the surface transversely to the path of movement thereof, a frame mounting both ends of said auger for rotation about its axis, said frame being supported to pivot on a frame axis transverse to the path of movement of the surface, drive means connected to said frame to pivot said frame on its axis for raising and lowering the auger into operative relationship with the material on said moving surface, a superstructure provided above said frame, a first member pivotally secured at one end to said superstructure, said first member depending downwardly therefrom and terminating adjacent the moving surface behind said auger, a paddle connected to said first member and spaced from said surface, said paddle swinging rearwardly away from said auger in response to a predetermined overaccumulation of particulate material on said surface, and said paddle swinging forwardly toward said auger in response to a predetermined underaccumulation of particulate material on said surface, a second member pivotally secured at one end to said superstructure for movement independently of said first member, linkage means connecting said second member to said frame to move said second member relative to said first member in response to pivotal movement of said frame on its axis, and means carried by said members and cooperating therewith to actuate said drive means to raise said auger when said members are moved apart and to lower said auger when said members are moved together, whereby the position of the auger is automatically adjusted in response to the accumulation of undistributed particulate material on the moving surface behind the auger, the auger being displaced upwardly in response to an overaccumulation of particulate material and being displaced downwardly in response to an underaccumulation of material, so that the thickness of the layer of distributed material on the surface is adjusted to correspond with the input of undistributed material to the auger.

9. Apparaus according to claim 8 wherein said drive means is electrically powered, and said means to actuate said drive means comprises a pair of limit switches carried by one of said members and a cam mounted on the other of said members to selectively engage each of said switches, one of said switches being connected to said drive means to displace said frame and auger upwardly, the other of said switches being connected to said drive means to displace said frame and auger downwardly, whereby the drive means cooperates with the limit switches to control the position of the auger in response to the displacement of the feeler means.

10. Apparatus in accordance with claim 8 wherein said linkage means comprises an arm extending outwardly from the frame into substantial parallelism with said second member, a threaded rod connecting said second member to said arm, one end of said rod being threaded opposite to the other end thereof, means providing a swivel connection between said rod and said second member and arm, and means for rotating said threaded rod, whereby the second member is moved relative to the arm and the first member to pre-position the members for adjusting the normal operating position of the auger.

References Cited

UNITED STATES PATENTS 2,589,690  3/1952  Graetz _____ 198—53

EVON C. BLUNK, Primary Examiner

A. N. GOODMAN, Assistant Examiner

U.S. Cl. X.R.

198—64, 213; 222—55